H. BLAU.
CARRIAGE LAMP.
APPLICATION FILED AUG. 6, 1908.
989,385.
Patented Nov. 9, 1909.
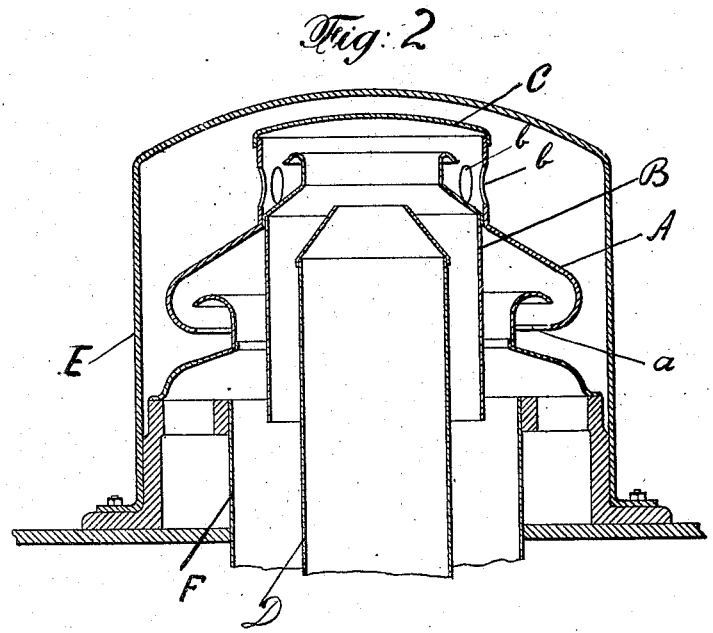
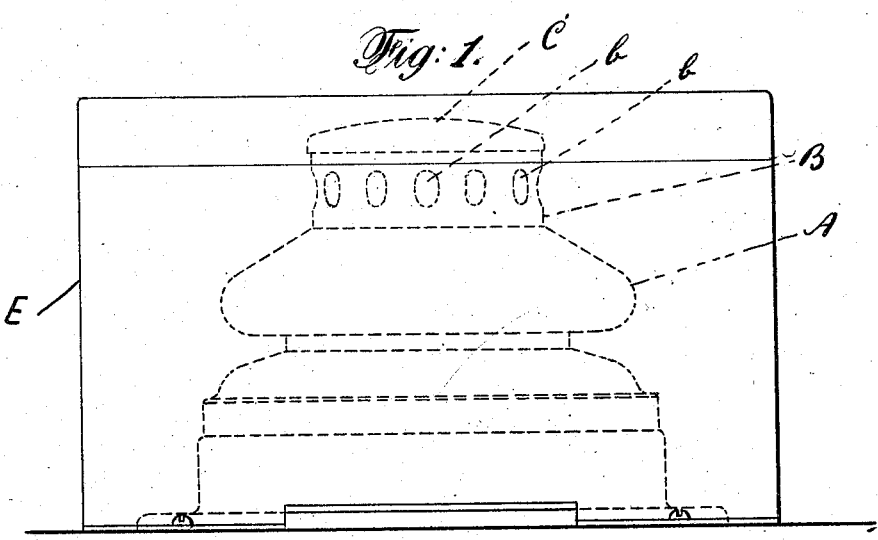
Witnesses:
Hermann Blau, Inventor
By his Attorney

UNITED STATES PATENT OFFICE.

HERMANN BLAU, OF AUGSBURG, GERMANY.

CARRIAGE-LAMP.

939,385.  Specification of Letters Patent.  Patented Nov. 9, 1909.

Application filed August 6, 1908. Serial No. 447,278.

*To all whom it may concern:*

Be it known that I, HERMANN BLAU, a citizen of Germany, residing at Augsburg, Bavaria, Germany, have invented certain new and useful Improvements in Carriage-Lamps; and I do hereby declare the following to be a full, clear, and exact description of the invention, such as will enable others skilled in the art to which it appertains to make and use the same.

This invention relates to lamps for illuminating carriages and has for its object the construction of such lamps in a manner to permit the inlet of fresh air and the outlet of the products of combustion, and, at the same time, to prevent the entrance of ashes or other particles into the lamp, especially during motion of the carriage.

In the accompanying drawings which form part of this specification, Figure 1 is an elevation of a carriage-lamp constructed in accordance with this invention, looking at the lamp when the carriage is approaching; Fig. 2 is an elevation in a vertical section parallel to the direction of motion of the carriage.

In the drawings like letters indicate like parts.

C is a cover for the lamp placed upon and above the roof of the carriage. The cover C is provided with parts forming channels or conduits passing through the roof of the carriage in order to supply fresh air to the lamp below the roof within the carriage and to lead off the waste gases or products of combustion.

D is a hollow, cylindrical part of suitable material forming a conduit for the passage of the products of combustion from the lamp below the roof within the carriage to the upper part of the cover C, whence the products of combustion escape through the exit holes *b b* with which the cover C is provided.

Surrounding the conduit D is a hollow, cylindrical part B which is surrounded by the part A. Parts B and A come together above, but not below, and the part A is provided with air-inlet holes *a a*, so that the parts B and A, together with the hollow cylindrical part F surrounding the lower part of conduit D, form a conduit for the passage of fresh air from without the carriage above the roof to the lamp within the carriage below the roof.

In order to prevent the entrance of ashes or other particles, through the above described conduits for the exit of the waste gases or the products of combustion and for the admission of fresh air, into the lamp, a hood E, closed at the front, back and top (relatively to the direction of motion of the carriage) is placed over the cover C and upon the roof of the carriage to which it is properly secured in any suitable manner. As shown in Fig. 1, hood E should, preferably, be of width sufficient to extend on each side beyond the cover C. Additional protection against the entrance of ashes or other foreign particles into the conduits mentioned may be obtained by protecting the outlet holes *b b* and the inlet holes *a a* by barriers, such as curved pieces of metal, placed opposite to or above the outlet and inlet holes, as shown in Fig. 2.

Lamps for illuminating railway carriages are provided with a conduit for the in-coming fresh air and a conduit for the out-going waste gases, both of which conduits have ports outside of the carriage, on the roof. A cap is so arranged on the conduit ports that the fresh air and waste gases cannot mix. Now it frequently happens that when the train is in motion ashes or the like from the locomotive enter the lamp through one or both of the above-mentioned conduits, and in the case of incandescent lamps this may cause injury to the mantle. By a suitable construction of the already mentioned caps and by means of special safety devices it has been found possible to remedy this disadvantage to a certain degree.

The device according to the present invention prevents the entrance of ashes or other particles into the lamp during the motion of the train in a very simple and effective manner and is based on the consideration that the particles of ash etc. will, in consequence of the motion of the train, always try to enter the lamp from the front.

The device consists essentially in a hood placed over the fresh air and waste gas ports, which hood is closed at the front, back and top (relatively to the direction of motion of the train), but has apertures at the sides.

From the figures of the drawings and the foregoing description it will be obvious that all particles of ash etc. will strike against the closed portion of the hood and will not be able to enter the fresh air or waste gas conduits, but that on the other hand fresh air and waste gas will find easy entrance and exit through the lateral openings in said hood.

What I claim as my invention and desire to secure by Letters Patent, is:

1. In a carriage-lamp, the combination of a hood closed at the top and front, relatively to the direction of motion of the carriage, and provided with a lateral aperture, and a cover, provided with parts forming a conduit for the admission of air, situated within the hood, substantially as described.

2. In a carriage-lamp, the combination of a hood closed at the top and front, relatively to the direction of motion of the carriage, and provided with a lateral aperture, and a cover, provided with parts forming a conduit for the admission of air and a conduit for the exit of the products of combustion, situated within the hood, substantially as described.

3. In a carriage-lamp, the combination of a hood closed at the top, front and back, relatively to the direction of motion of the carriage, and provided with a lateral aperture, and a cover, provided with parts forming a conduit for the admission of air and a conduit for the exit of the products of combustion, situated within the hood, substantially as described.

4. In a carriage-lamp, the combination of the roof of the carriage, a hood closed at the top and front, relatively to the direction of motion of the carriage, superimposed on the roof and provided with a lateral aperture, and a cover, provided with parts forming a conduit for the admission of air, extending from above to below the roof, situated within the hood, substantially as described.

5. In a carriage-lamp, the combination of the roof of the carriage, a hood closed at the top and front, relatively to the direction of motion of the carriage, superimposed on the roof and provided with a lateral aperture, and a cover, provided with parts forming a conduit for the admission of air and a conduit for the exit of the products of combustion, extending from above to below the roof, situated within the hood, substantially as described.

6. In a carriage-lamp, the combination of the roof of the carriage, a hood closed at the top and front, relatively to the direction of motion of the carriage, superimposed on the roof and provided with a lateral aperture, and a cover, provided with parts forming a conduit for the admission of air and a conduit for the exit of the products of combustion, extending from above to below the roof, the inlet to the conduit for the admission of air being situated below the outlet of the conduit for the exit of the products of combustion and said cover being situated within the hood, substantially as described.

7. In a carriage-lamp, the combination of the roof of the carriage, a hood closed at the top and front, relatively to the direction of motion of the carriage, superimposed on the roof and provided with a lateral aperture, and a cover, provided with parts forming a conduit for the exit of the products of combustion and a conduit for the admission of air surrounding the conduit for the exit of the products of combustion, said conduits extending from above to below the roof and said cover being situated within the hood, substantially as described.

8. In a carriage-lamp, the combination of a hood closed at the top and front, relatively to the direction of motion of the carriage, and provided with a lateral aperture, and a cover, provided with parts forming a conduit for the admission of air and a barrier opposite to the external opening of the conduit, said cover being situated within the hood, substantially as described.

9. In a carriage-lamp, the combination of a hood closed at the top and front, relatively to the direction of motion of the carriage, and provided with a lateral aperture, and a cover, provided with parts forming a conduit for the admission of air and a conduit for the exit of the products of combustion, and with a barrier opposite to the external opening of each of said conduits, said cover being situated within the hood, substantially as described.

In testimony whereof I hereunto affix my signature in the presence of two witnesses.

HERMANN BLAU.

Witnesses:
MATHILDE K. HELD.
LOUIS MUELLER.